United States Patent [19]

Busy

[11] 3,950,748

[45] Apr. 13, 1976

[54] METHOD OF AND APPARATUS FOR STABILIZING THE DISPLAY RATE OF PERMANENT ECHOES IN A RADAR SYSTEM

[75] Inventor: Francis Busy, Paris, France

[73] Assignee: Thomson-CSF Visualisation et Traitement des Informations (T-VT), Paris, France

[22] Filed: June 17, 1974

[21] Appl. No.: 480,145

[30] Foreign Application Priority Data
June 19, 1973 France .............................. 73.22308

[52] U.S. Cl. ................................................ 343/7 A
[51] Int. Cl.² .......................................... G01S 9/02
[58] Field of Search ............. 343/7 A, 5 DP, 17.1 R

[56] References Cited
UNITED STATES PATENTS

| | | | |
|---|---|---|---|
| 3,380,018 | 4/1968 | Littrell et al. ........................... | 343/74 |
| 3,430,235 | 2/1969 | Bender et al. ....................... | 343/7 A |
| 3,505,637 | 4/1970 | Abruzzo ............................... | 343/7 A |
| 3,582,872 | 6/1971 | Prager .................................. | 343/7 A |
| 3,761,922 | 9/1973 | Evans ................................. | 343/5 DP |
| 3,778,822 | 12/1973 | Bauer ................................... | 343/5 R |
| 3,778,825 | 12/1973 | Ares et al. ............................. | 343/7 A |

Primary Examiner—T. H. Tubbesing
Assistant Examiner—G. E. Montone
Attorney, Agent, or Firm—Karl F. Ross; Herbert Dubno

[57] ABSTRACT

A method and an apparatus for determining in a radar system the optimum elimination threshold for suppressing permanent echoes are described. A basic elimination threshold is defined which is modified once per revolution of the radar antenna or several times during each revolution in each area covered by the radar system, by the addition or the subtraction of a coefficient depending on the comparison of the amplitude of the video signals with a previously set threshold. Then the residual clutter rate is calculated for each revolution of the antenna and also for each area covered and is compared with two fixed values, i.e. an upper and lower limit. A coefficient is derived from this comparison and is added to or subtracted from this previously set normal threshold, depending on whether the result of the comparison, is less than the minimum-rate value or greater than the maximum-rate value.

11 Claims, 7 Drawing Figures

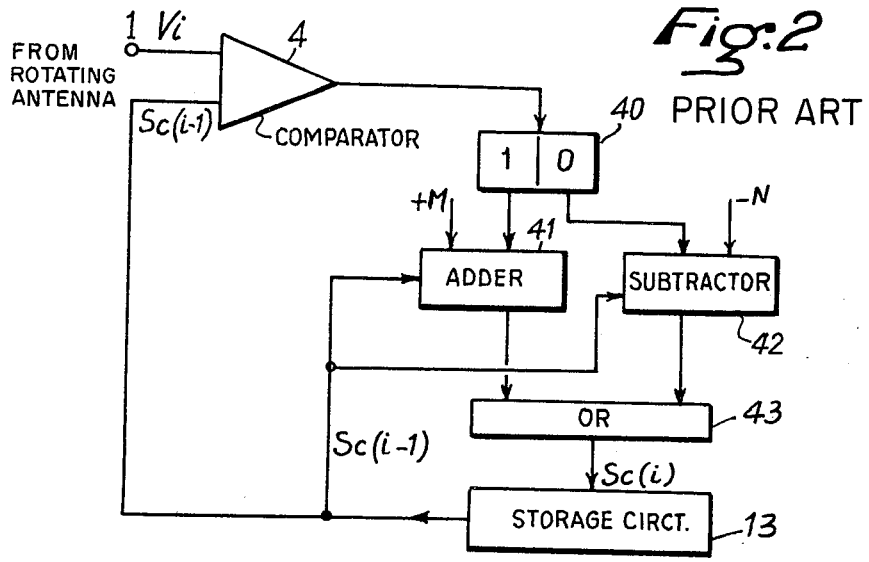
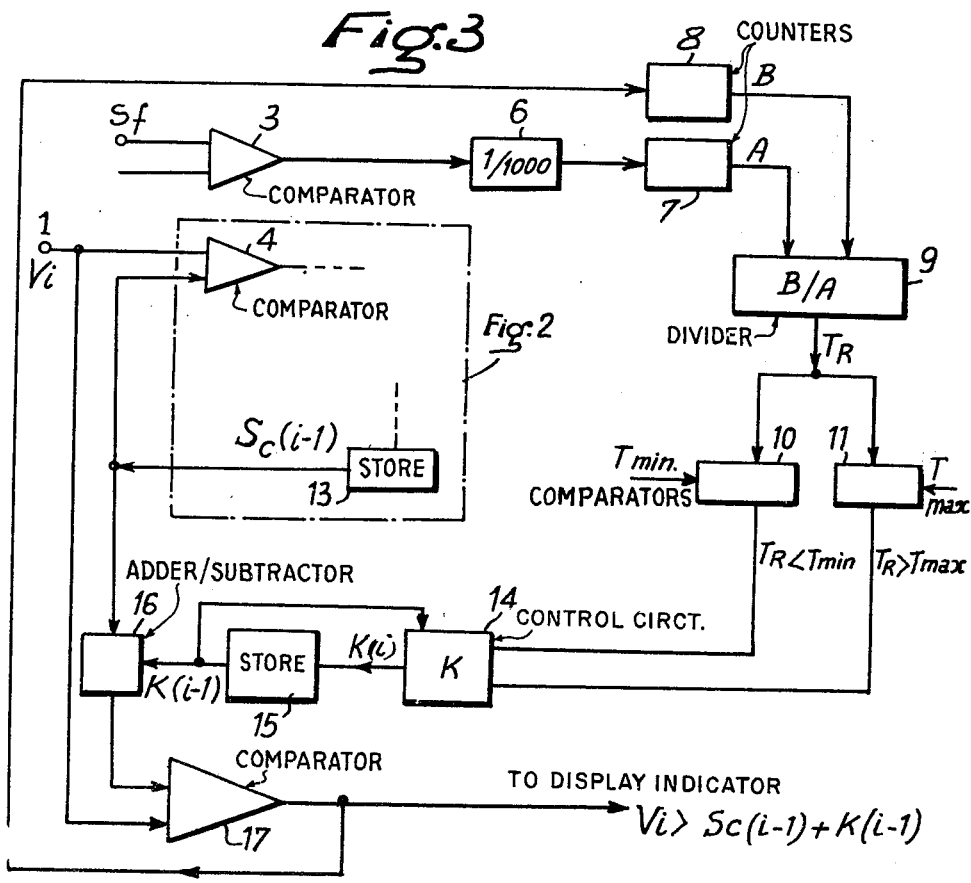

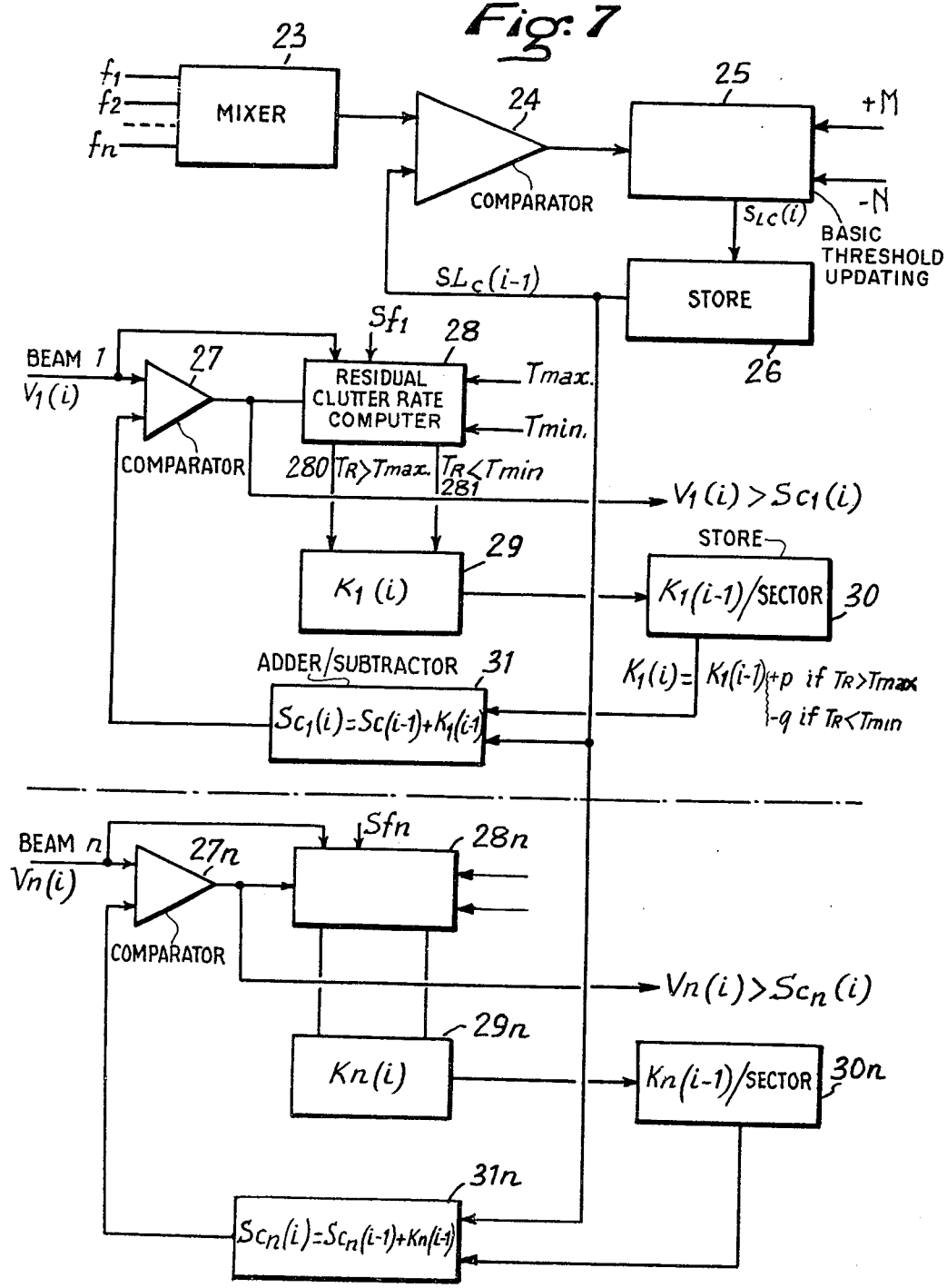

METHOD OF AND APPARATUS FOR STABILIZING THE DISPLAY RATE OF PERMANENT ECHOES IN A RADAR SYSTEM

BACKGROUND OF THE INVENTION

My present invention relates to the determination of the optimum elimination threshold in a radar system for suppressing permanent echoes, applicable inter alia to multi-beam radar systems.

It is known that the detection of targets, mainly low-flying targets, by a radar system is impeded by ambient conditions outside the system, i.e. stationary objects or slow-moving objects or "ground" or "sea" echoes due to the reflection from the soil or from the crests of waves of the energy radiated by the radar system. These conditions make it more difficult for the radar system to detect the required targets, which are surrounded by such undesirable echoes. The echoes, which interfere with proper use of the radar system, are known as "clutter". The term "residual clutter" denotes echoes of this nature surpassing a pre-established threshold level, resulting in so called false alarms.

Some known devices are used in an attempt to obviate the aforementioned disadvantages. These devices, which eliminate permanent echoes, are known as "moving-target indicators" (MTI).

One of the conventional devices of this type, called an "Area MTI", eliminates permanent echoes in one area at a time and will be further described here since the system according to the invention is based on the same principle. A discussion of an Area MTI can be found in Barton (Prentice Hall Series 1964) Radar System Analysis, page 224, or in Merrill Skolnik (Mc Graw Hill Book Co 1970) Radar Handbook, pages 17–54 and 17–55.

The radar area to be processed is divided into elementary compartments which receive a certain video-frequency energy at each revolution of the antenna. Upon each revolution, this energy is compared with a threshold which has been set to allow for the average energy received from a surveyed zone during the preceding antenna revolutions. The threshold value $S_c(i-1)$, set at the $(i-1)$th antenna revolution, and compared with the energy received at the $i^{th}$ revolution is automatically adjusted for each zone thus swept by the antenna beam.

FIG. 1 shows the conventional method of setting the threshold used to determine the presence or absence of an echo from the target. The variation in the threshold $S_c(i)$ is given in dependence on the antenna revolutions $i$, and the drawing shows the level CL corresponding to the noise amplitude in the swept zone and the energy corresponding to the undesired signals or clutter. Under these conditions, the desired signal corresponds to the instantaneous increase in average energy when a moving target travels through the compartment.

Accordingly, the threshold value is increased by a value $M$ whenever an input signal occurring in the swept zone has an amplitude greater than the previously-set threshold, in which case an echo indication is transmitted to the radar receiver for display in the usual manner.

On the other hand, the threshold value is reduced by a value $N$ if no input signal is present or if a signal is present and its amplitude is less than the previously-set threshold.

The values of $M$ and $N$ used to update the basic threshold $S_c$ are integers and different from one another, the increment $M$ being made greater than the decrement $N$.

Accordingly, if $Vi$ is the amplitude of the signal received by the compartment in question at the $i^{th}$ antenna revolution, $S_c(i-1)$ is the threshold set before the last-mentioned antenna revolution but used as a comparison value for the energy received at the following or $i^{th}$ revolution, and $S_c(i)$ is the threshold value obtained and therefore calculated after comparing the voltage $Vi$ with the threshold $S_c(i-1)$, then, if $Vi > S_c(i-1)$, i.e. if there is an echo, the threshold value becomes $S_c(i) = S_c(i-1) + M$ for the following or $(i+1)^{th}$ antenna revolution.

If $Vi < S_c(i-1)$, there is no echo and the threshold is set at $S_c(i) = S_c(i-1) - N$.

Consequently, assuming that the amplitude of the return or echo signal remains constant, the variable threshold $S_c(i)$ is held close to the clutter level CL. The residual clutter rate $tx$ can be shown to be:

$$tx = \left(\frac{M}{N} + 1\right)^{-1} \times 100\% \qquad (1)$$

It can be seen that the residual clutter rate is important, since it can be used for more accurately determining the modifications to be made to the set threshold in order to ensure optimum elimination of permanent echoes under various practical conditions.

According to (FIG. 1) the threshold value automatically follows slow fluctuations in the amplitude of the received signal, since the value of the threshold is periodically set at less than the signal amplitude CL due to permanent echoes. In accordance with formula (1), this comparison gives rise to a non-zero residual rate.

The object of the invention is to obtain a low residual clutter rate so as to improve the elimination of permanent echoes.

I realize this object, in accordance with the present invention, by comparing an input signal $Vi$ from a recurrently swept zone with a variable threshold $S_c$, conventionally established as explained above, while modifying that threshold by the addition (or subtraction) of a supplemental parameter $K$ whose magnitude, in turn, is varied in dependence upon deviations of the residual clutter rate from a standard. More specifically, as long as the ratio of the number of echoes surpassing the variable threshold to the number of echoes surpassing a predetermined fixed threshold $Sf$ stays within given limits, parameter $K$ is not changed; otherwise, its value is altered in a sense tending to eliminate the aforementioned deviations, i.e. to restore the residual clutter rate to a range of numerical values defined by these limits. Thus, the modified threshold represented by the algebraic sum of basic threshold $S_c$ and supplemental parameter $K$ is increased if the aforementioned ratio exceeds the upper range limit (positive deviation) but is reduced if it falls short of the lower range limit (negative deviation).

Advantageously, any change of the supplemental parameter $K$ during a sweep of a surveyed zone is utilized in the next-following sweep of the same zone; thus, an echo is registered on the radar display whenever the input signal $Vi$ in the current sweep $i$ exceeds the algebraic sum of $S_c(i-1)$ and $K(i-1)$.

In this way the display rate of permanent echoes or false alarms is stabilized at an optimum value. The described technique can be extended to a multi-beam radar system, either by applying the given result to each beam or by first defining a threshold from a mixture of video signals from all the beams in question, or from groups of beams, and suubsequently modifying the threshold for each beam or group of beams.

BRIEF DESCRIPTION OF THE DRAWINGS

Other features and advantages of my invention will become apparent from the following description of certain embodiments given with reference to the accompanying drawings:

FIG. 2 shows a threshold-setting device in a conventional system for eliminating permanent echoes in one area of exploration at a time;

FIG. 3 shows a device for setting the optimum elimination threshold according to the invention;

FIG. 7 shows a modification of the system of FIG. 6.

SPECIFIC DESCRIPTION

We have seen that, according to the invention, the determination of an optimum threshold for improved elimination of permanent echoes in a single beam or multi-beam radar system is dependent on a knowledge of the residual clutter rate when the radar system operates under normal conditions. I shall therefore first describe a prior-art Area MTI, since it is used in obtaining the optimum threshold according to the invention.

Figure 1:
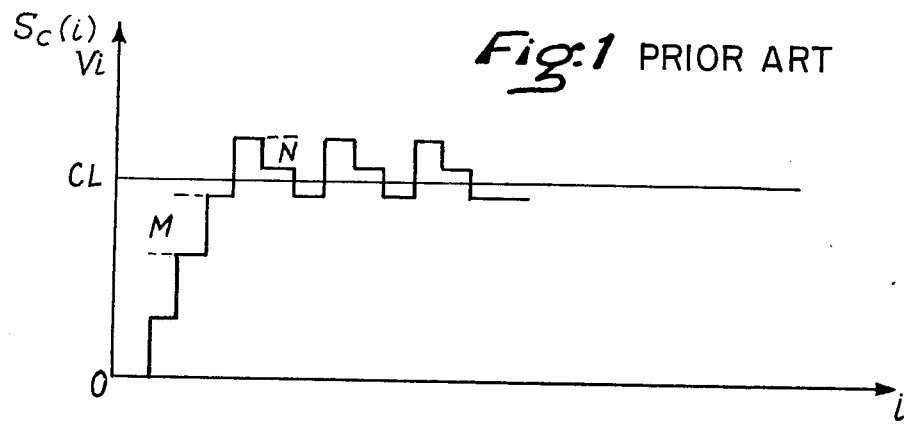
FIG. 1 is a graph pertaining to the prior art as discussed above.

FIG. 2 shows an Area MTI for setting a reference threshold as defined in conjunction FIG. 1. The video signals delivered by the associated radar system appear at 1 and are applied to a comparator 4 whose other input receives a variable threshold usually elaborated during the previous revolution of the antenna, i.e. $S_c(i-1)$.

If the video signals exceed this threshold, an echo is present and is indicated by a signal 1 at the output of a digitizer circuit 40. If the video signals are below the threshold, there is no echo and a signal O appears at the output of circuit 40.

If an echo is present, a signal M is added to the threshold $S_c(i-1)$ delivered by a storage circuit 13 to an adder circuit 41 which then feeds a new threshold value to the storage circuit 13 via an OR circuit 43. If there is no echo, a similar process occurs in which a subtractor circuit 42 subtracts the signal N from the previously-defined threshold value $S_c(i-1)$. A new threshold $S_c(i)$ is then stored in circuit 13 via the OR circuit 43.

FIG. 3 shows a system according to my invention for setting the threshold in dependence on the residual clutter rate in a radar beam.

In this embodiment, a calculation is made during each antenna revolution of the residual clutter rate resulting from the action, during the preceding revolution, of the Area MTI described in connection with FIG. 2. The residual clutter is compared with two limiting values serving as a standard of compression, namely the minimum rate (Tmin) and the maximum rate (Tmax), chosen in accordance with the desired residual rate, in accordance with the particular application.

In the beam in question, a count is made of the number of video signals or input 1 exceeding above an adjustable but fixed reference threshold Sf applied to a comparator 3. Threshold Sf can be of the kind used for automatically obtaining a given rate of false alarms. The number of signals is registered in a counter 7, e.g. after being divided by 1000 in step down circuit 6 in order to obtain the proportion per thousand. In the beam in question, a count is also made of the number of video signals applied to input 1 and having an amplitude greater than the previously-defined modified threshold $S_c(i-1) + K(i-1)$, this number being registered in a second counter 8. A divider circuit 9 establishes the ratio B/A between the data registered in counters 7 and 8, respectively, and the result TR ("residual rate") is compared with the limits value Tmin and Tmax in comparators 10 and 11, respectively.

If rate $T_R$ lies between the minimum and maximum values, the calculation of the coefficient K is not modified by the control circuit 7-11. If, on the other hand, the comparison between the signals applied to comparator 10 shows that the value $T_R$ from divider 9 is less than the minimum rate, this means that the elimination has been excessive, i.e. that the coefficient $K(i-1)$ added to the threshold $S_c(i-1)$ for the preceding revolution was too large and must be reduced. Conversely, if the comparison in circuit 11 indicates that rate $T_R$ is greater than the maximum rate, the elimination rate was insufficient and coefficient $K(i-1)$ was too small and must be increased. Consequently, a control circuit 14 for calculating modified coefficient has inputs connected to circuit 9 via comparators 10 and 11 respectively. The resulting new coefficient K(i) is stored in a circuit 15 which previously supplied the coefficient $K(i-1)$, and is thence conveyed to an adder 16 which receives the threshold $S_c(i-1)$ stored in circuit 13. Circuit 16 supplies the new optimum threshold, e.g. the parameter $S_c(i)+K(i)$ for the $i^{th}$ antenna revolution, which is applied to one input of a comparison circuit 17 whose other input receives the video signals Vi appearing at the input 1 of the processing device. The threshold $S_c(i)$ is again obtained, in the manner described in conjunction with FIG. 2 under the control of the comparison circuit 4 which receives the video signal Vi from the beam in question appearing at input 1 and also receives the value of the threshold $S_c(i-1)$ set during the preceding antenna revolution. This value is supplied by the store 13, which register the new threshold $S_c(i)$, working into counter 8. Comparator 17 passes video signals having an amplitude greater than the new threshold in accordance with the inequality $Vi > S_c(i-1) + K(i-1)$.

Figure 4:
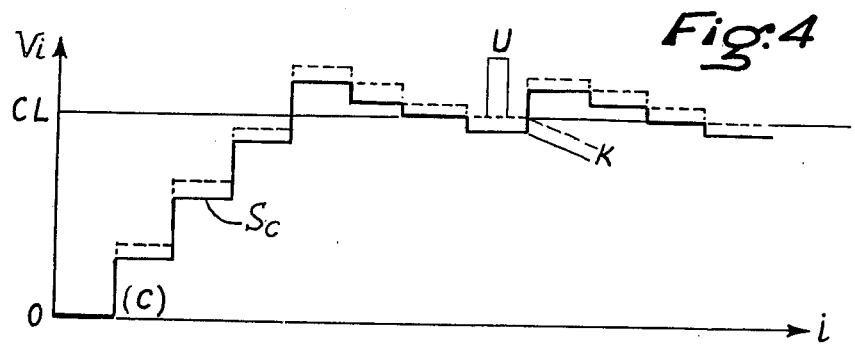
FIG. 4 is a curve showing the position of the threshold in my improved system.

FIG. 4 illustrates the operation of the system of FIG. 3 by a curve C similar to the curve of FIG. 1, showing in dotted lines the calculated value $K$ to the threshold $S_c$, indicated in full lines, as well as the fixed incremental values M and N serving to update the basic threshold. The clutter level is again shown by a line CL, the ordinate being used for the signal amplitude Vi and the abscissa being used for the antenna revolutions $i$. In FIG. 4, for the sake of clarity the value of K has been shown constant. Even though, as already shown, it can be modified from one antenna revolution to another to stabilize the false-alarm ratio $B/A = T_R$.

Figure 5:
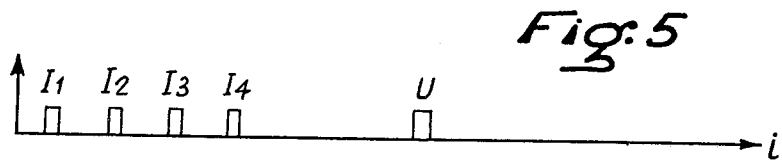
FIG. 5 shows the echo pulses detected.

FIG. 5 shows the video output signals and a useful signal (marked U) which exceeds the undesired-signal or clutter level. As can be seen, the first echo pulses I1 to I4 appear during the time taken to establish the threshold.

Hitherto it has been assumed that the residual rate was calculated once for each antenna revolution. This method gives a certain definition for radar detection. According to another feature of my invention, the calculation can be made a number $j$ of times per revolution, thus improving the definition of detection by dividing the radar coverage into $j$ sectors (in azimuth) or rings (in range). Inside these zones, the thresholds or coefficients are determined according to the invention in the manner described. The amounts added or subtracted will be different from those previously mentioned.

In the foregoing I have discussed the setting-up of an optimum threshold facilitating the elimination of permanent echoes in a single-beam radar system. I shall now discuss the setting-up of a similar threshold in a multi-beam system.

Figure 6:
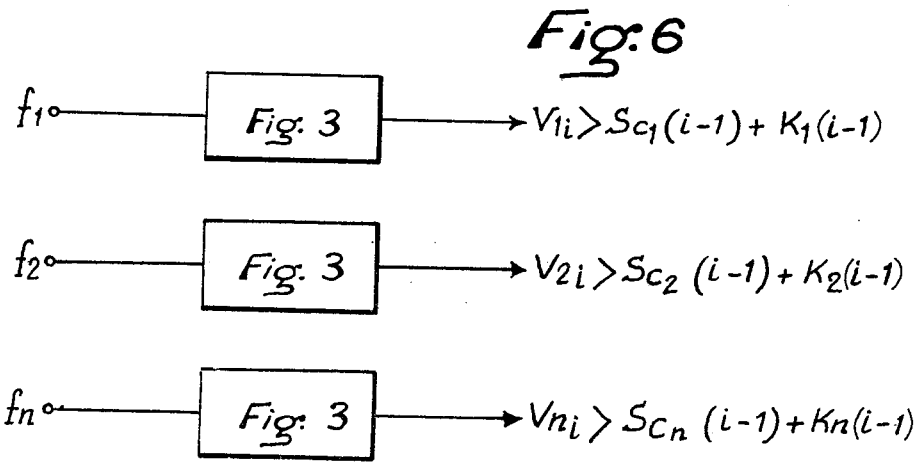
FIG. 6 shows a device for determining the optimum elimination threshold in a multi-beam radar system, according to my invention

The simple solution is to treat each beam independently of the others, in the manner described. FIG. 6 shows a system of this kind, where each beam $f1, f2, \ldots fn$ for producing signals $V_{1i}, V_{2i}, \ldots V_{ni}$ is processed as described with reference to FIG. 3. If this method is used, however, the beam-processing circuits have to be multiplied by the number of beams.

FIG. 7 shows a modified system, designed to avoid this duplication of circuitry, wherein a base threshold is obtained from a mixture of video signals from all the beams, the threshold subsequently being modified for one beam at a time, depending on the clutter level for each beam.

A mixer 23 having a number of inputs for incoming beams f1 to fn receives the video signals therefore and delivers a composite signal which includes the individual signals, the composite signal being applied to one input of a first comparator 24 whose other input receives a reference signal representing a threshold $SL_c(i-1)$ set during the preceding reference period, i.e. the preceding antenna revolution or the sweep of the sector previously covered. The comparison circuit 24 is connected to a circuit 25 for determining the threshold $SL_c(i)$ in the previously described manner, threshold generator 25 receiving signals M and N for increasing or decreasing the preceding threshold as required. Circuit 25 is connected to a storage circuit 26 which registers the calculated threshold $SL_c(i)$ and supplies the threshold previously determined by the same method. Threshold $SL_c(i-1)$ is used as a base for determining the modified threshold for stabilizing at an optimum value the display rate of permanent echoes in each beam. The advantage of this base threshold is that it takes into consideration the video contents of each beam, so that it more closely follows the maximum clutter level in the beam in question.

Accordingly, each circuit for processing the video signals of a beam comprises a second comparator 27 to 27n receiving the energy collected in a beam and also receiving the previously-calculated threshold in the manner described with reference to FIG. 3. The preceding threshold is equal to $SL_{c1}(i-1) + K_1(i-1) \ldots SL_{cn}(i-1) + K_n(i-1)$ and is supplied by a circuit 31 to 31n connected to the store 26. Each processor also comprises a computer 28 to 28n for determining the residual clutter rate, similar to the circuit arrangement described in connection with FIG. 3 for the case where the signals of a mono-beam radar system are processed, the computer receiving a threshold signal $Sf_1$ to $Sf_n$. The computer also receives signals corresponding to Tmax and Tmin respectively, i.e. to the maximum and minimum residual clutter. Depending on the individual case, the computer emits a signal $T_R$ at an output 280 or 281 indicating that the calculated residual clutter is either greater than the maximum or less than the minimum rate. The emitted output signal is applied to a calculator 29 to 29n which, by the previously-defined process, determines the coefficient $K_1(i) \ldots K_n(i)$ whose value is added to the previously-defined threshold. Coefficient $K_1$ to $K_n$ is stored in a circuit 30 to 30n and supplied to a circuit 31 to 31n at the next antenna revolution.

Thus, coefficient $K_1(i)$ is equal to the previously elaborated coefficient $K_1(i-1)$ augmented by a value $p$ or diminished by a value $q$, depending on whether the calculated residual rate in circuit 28 is greater than the maximum or less than the minimum rate for displayed false alarms. The value of p can be made dependent on the deviation between $T_R$ and the maximum rate, and q can be made dependent on the deviation between $T_R$ and the minimum rate.

Accordingly, I have shown how to determine an optimum threshold for eliminating permanent echoes in an Area MTI, using results supplied by a circuit for determining the residual clutter rate and acting one or more times during each antenna revolution, depending on the number of sectors or zones into which the radar coverage has been divided. Algebraic summing circuits 16, 31 . . . 31n may also operate as subtractors rather than adders, the modified threshold of inequality (2) then assuming the value $S_c(i-1) - K(i-1)$.

What is claimed is:
1. A method of operating a radar system wherein an input signal from a recurrently swept zone is compared with a threshold and is displayed as an echo pulse upon exceeding said threshold, comprising the steps of:
   a. establishing a basic threshold for determining the minimum value of an input signal to be displayed;
   b. updating said basic threshold from step (a) by comparing the input signal of a current sweep with the basic threshold of a preceding sweep of the same zone and incrementing the last-mentioned threshold by a fixed amount of such sign as to maintain said basic threshold close to a clutter level defined by permanent echoes from the swept zone;
   c. modifying the updated basic threshold from step (b) by algebraically adding thereto a supplemental parameter;
   d. comparing said input signal with the modified basic threshold from step (c) to detect echo pulses to be displayed;
   e. determining any deviations of the recurrence rate of said echo pulses from a given standard; and
   f. varying the value of said supplemental parameter in a sense tending to eliminate said deviations.
2. The method defined in claim 1 wherein the determination in step (e) is carried out by making a first count of the number of echo pulses detected in step (d), concurrently making a second count of the number of times said input signal exceeds a predetermined fixed threshold, registering a positive deviation upon the ratio of said first to said second count exceeding a predetermined upper range limit, and registering a negative deviation upon said ratio falling short of a predetermined lower range limit.

3. The method defined in claim 1 wherein steps (a) through (f) are performed separately for different zones swept in a recurrent cycle.

4. The method defined in claim 1 wherein the input signal in steps (a) and (b) is synthesized from a plurality of different zones swept in the course of a revolution of a radar antenna, steps (c) through (f) being separately performed with individual input signals from said zones.

5. In a radar system having a rotating antenna, receiving means for obtaining from said antenna an input signal resulting from reflected beam energy picked up in a recurrent sweep of a surveyed zone, and indicator means for displaying an echo pulse in response to an input signal exceeding a certain threshold, the combination therewith of:

storage means for registering said basic threshold determining the minimum value of an input signal to be displayed;

first comparison means connected to said receiving means and to said storage means for generating a first output signal depending upon the relative magnitudes of said input signal and said basic threshold;

updating means connected to said first comparison means for incrementing said basic threshold in said storage means by a fixed amount of a sign depending upon said first output signal to maintain said basic threshold close to a clutter level defined by permanent echoes from the swept zone;

modification means connected to said storage means for algebraically adding a supplemental parameter to said basic threshold;

second comparison means connected to said modification means and to said receiving means for producing a second output signal transmitted to said indicator means upon said input signal exceeding the algebraic sum of said basic threshold and said supplemental parameter;

a reference circuit including third comparison means for generating a third output signal upon a deviation of the recurrence rate of said second output signal from a predetermined standard; and control means responsive to said third output signal inserted between said third comparison means and said modification means for varying the value of said supplemental parameter in a sense tending to eliminate said deviation.

6. The combination defined in claim 5 wherein said reference circuit comprises fourth comparison means connected to said receiving means and to a source of fixed threshold for generating a fourth output signal upon said input signal exceeding said fixed threshold, two counters respectively connected to said second and fourth comparison means for providing counts of said second and fourth output signals, and arithmetic means connected to said counters for feeding the ratio of said counts to said third comparison means.

7. The combination defined in claim 6 wherein said third comparison means comprises two comparators connected in parallel to said arithmetic means, said standard being a range of numerical values between a lower limiting value supplied to one of said comparators and an upper limiting value supplied to the other of said comparators, said one of said comparators emitting one type of third output signal upon said ratio falling short of said lower limiting value, said other of said comparators emitting another type of third output signal upon said ratio exceeding said upper limiting value.

8. The combination defined in claim 6 wherein said reference circuit includes step-down means inserted between said fourth comparison means and the associated counter for dividing the recurrence rate of said fourth output signal by a predetermined factor.

9. The combination defined in claim 5 wherein said receiving means is effective to obtain a plurality of input signals from sweeps of different zones during each antenna revolution, said modification means being duplicated for independently establishing said algebraic sum for each of said zones.

10. The combination defined in claim 9 wherein said storage means and first comparison means are common to all the zones, said storage means being connected in parallel to all the duplicated modification means serving said zones.

11. The combination defined in claim 10, further comprising mixer means inserted between said receiving means and said first comparison means for synthesizing a composite signal from all the input signals appearing during each revolution.

* * * * *